United States Patent

[11] 3,576,959

| [72] | Inventor | John P. Bogosoff<br>Battle Creek, Mich. |
|---|---|---|
| [21] | Appl. No. | 873,843 |
| [22] | Filed | Nov. 4, 1969 |
| [45] | Patented | May 4, 1971 |
| [73] | Assignee | General Motors Corporation<br>Detroit, Mich. |

[54] BRAKE WARNING SWITCH
8 Claims, 5 Drawing Figs.

[52] U.S. Cl. .................................................. 200/84,
200/82, 340/52, 340/60, 340/242, 188/1, 60/54.5
[51] Int. Cl. ...................................................... H01h 35/18
[50] Field of Search .......................................... 200/82.3,
82, 84, 84.3; 340/52 (C), 60, 242; 188/1 (A);
60/54.5, 6 (E)

[56] References Cited
UNITED STATES PATENTS

| 2,161,441 | 6/1939 | Vickers ........................ | 200/84 |
| 3,363,073 | 1/1968 | Bouguet ...................... | 200/84.3 |
| 3,448,579 | 6/1969 | Reznicek .................... | 188/1A(UX) |
| 3,451,051 | 6/1969 | Randol ....................... | 200/84X |

Primary Examiner—David Smith, Jr.
Attorneys—J. L. Carpenter and Paul Fitzpatrick ABSTRACT: A vehicle brake system master cylinder assembly is provided with a switch assembly employing a float to monitor both fluid level in a reservoir and excessive travel of a fluid-pressurizing piston. The float itself responds to the fluid level and an upper float travel limit is established in accordance with the piston position.

INVENTOR.
John P. Bogosoff
BY
Paul Fitzpatrick
ATTORNEY

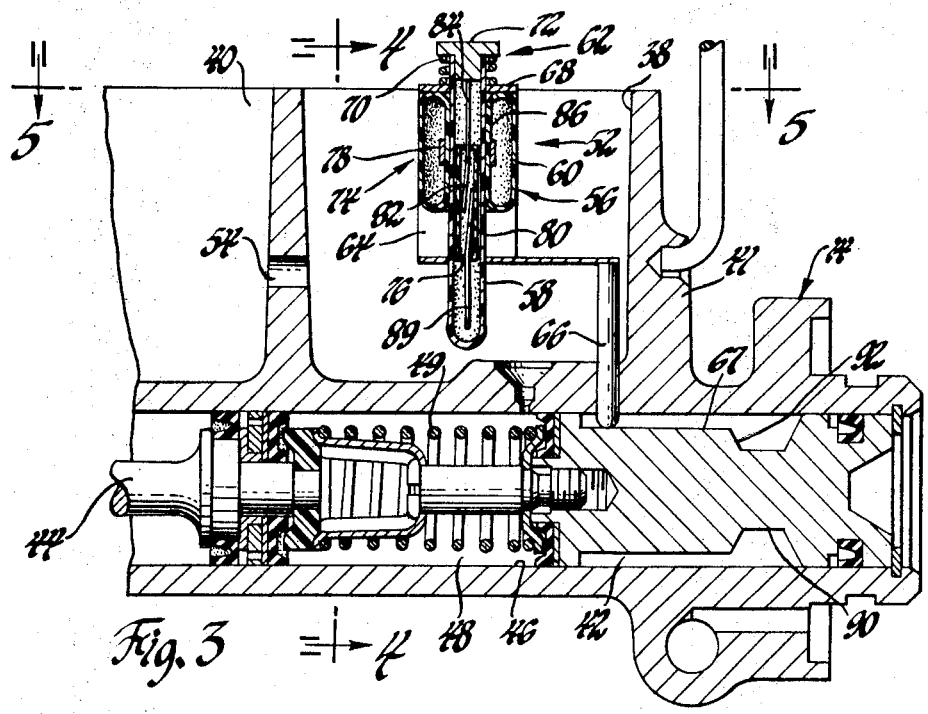
Fig. 3
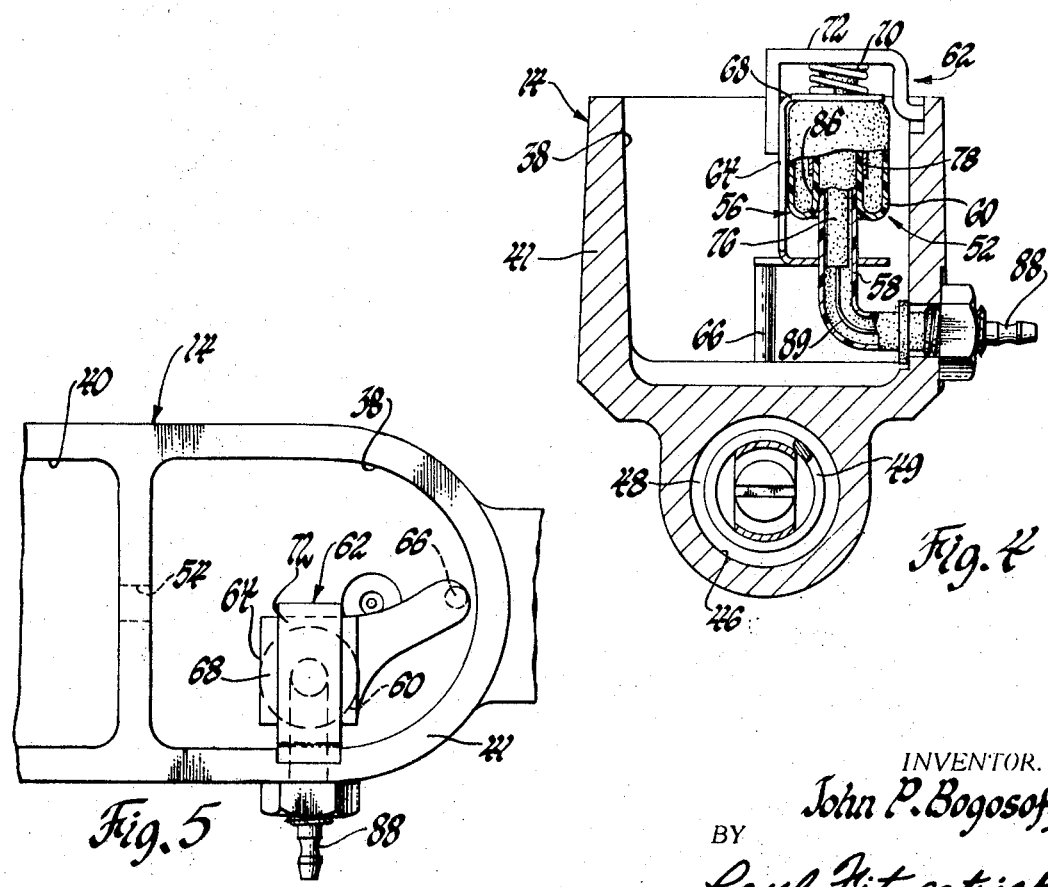
Fig. 4
Fig. 5
INVENTOR.
John P. Bogosoff
BY
Paul Fitzpatrick
ATTORNEY

BRAKE WARNING SWITCH

This invention relates to master cylinders of the type employed in automobile braking systems and in particular to switch apparatus for use in a master cylinder to monitor low fluid level in a fluid reservoir and excessive travel of a fluid-pressurizing piston.

Brake systems used in present-day automobiles customarily employ wheel cylinders for actuation of the vehicle brakes at each of its respective wheels and a master cylinder for supplying hydraulic fluid under pressure to the respective wheel cylinders. In recent years the master cylinder employed by new vehicles has customarily included two fluid reservoirs and an equal number of hydraulic fluid-pressurizing pistons. One such master cylinder is disclosed in the patent to Rike et al. U.S. Pat No. 3,412,556. It is the primary object of this invention to provide a switch assembly responsive both to the fluid level in such a reservoir and to the piston travel.

Figure 1:
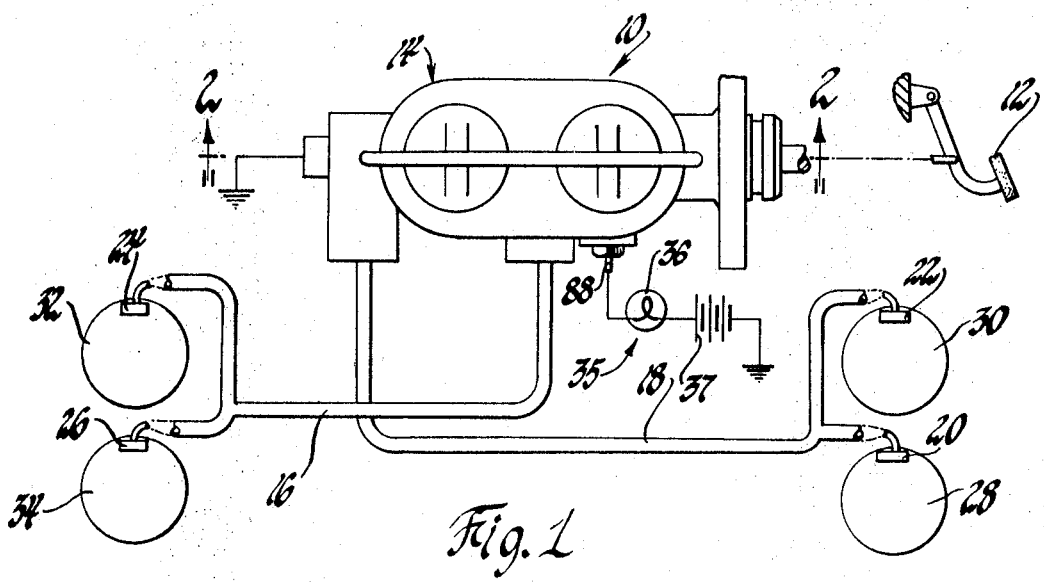
Figure 2:
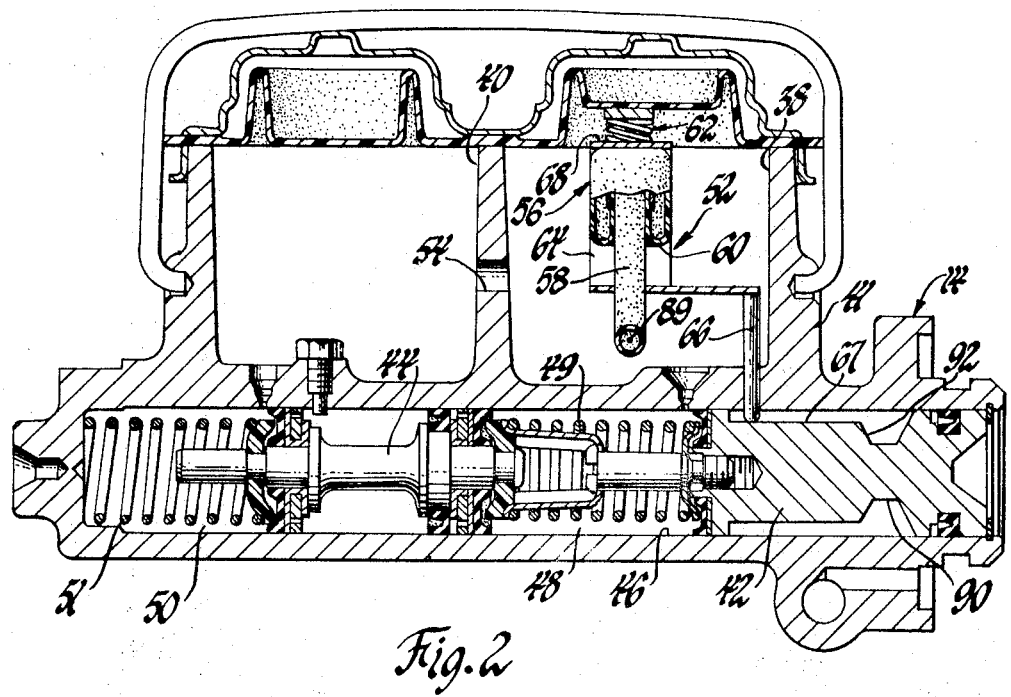

Other objects and advantages of the subject invention will become apparent from the following description and drawings, in which:

FIG. 1 is a schematic representation of a vehicle brake system embodying the invention, FIG. 2 is a cross section view of the master cylinder assembly shown in FIG. 1 taken in the direction of the arrows 2-2 in that FIG., FIG. 3 is a modified cross section view with parts broken away of the master cylinder assembly in FIG. 2, FIG. 4 is a sectional view of the master cylinder assembly of FIG. 3 taken in the direction of the arrows 4-4 in that FIG., and FIG. 5 is an elevational view of a portion of the master cylinder assembly of FIG. 3 taken in the direction of the arrows 5-5 in that FIG.

Referring now to the drawings, FIG. 1 illustrates a vehicle brake system 10 embodying the invention. The brake system 10 is of a well-known type in which a vehicle foot pedal 12 is employed to actuate a master cylinder assembly 14 so as to pressurize a plurality of hydraulic lines 16 and 18 and wheel cylinders 20, 22, 24, and 26 located at the respective wheels 28, 30, 32, and 34 of a vehicle (not shown). An indicator circuit 35 comprising an indicator lamp 36 and a battery 37 is provided for advising the vehicle operator as to conditions in the master cylinder assembly 14, as will subsequently be explained.

As is seen in FIG. 2, the master cylinder assembly 14 is of the familiar type described in Rike et al. U.S. Pat. No. 3,412,556. The master cylinder assembly 14 includes first and second hydraulic fluid reservoirs 38 and 40 formed in an electrically grounded housing 41 and primary and secondary pressurizing pistons 42 and 44 located in a bore 46 in the housing 41.

When the foot pedal 12 is depressed the primary piston 42 is displaced from its illustrated normal position in FIG. 2 to the left so as to pressurize hydraulic fluid contained in a first pressurizing chamber 48 containing a first restoring spring 49. The hydraulic pressure in the first chamber 48 forces the secondary piston 44 from its illustrated normal position to the left so as to pressurize hydraulic fluid in a second pressurizing chamber 50 located between the secondary piston 44 and the end of the bore 46 and containing a second restoring spring 51. The pressurized fluid from the chambers 48 and 50 pressurizes the respective hydraulic lines 16 and 18 for actuation of the vehicle springs in a conventional fashion. Upon release of the pedal 12 the springs 49 and 51 return the pistons 42 and 44 to their normal positions and equilibrium of pressures is established. To assure proper operation of the brake system 10 the reservoirs 38 and 40 are customarily nearly filled to capacity with hydraulic fluid so as to maintain an adequate fluid reserve. During normal operation of the master cylinder assembly 14 the fluid reserve remains at approximately this level. When the master cylinder assembly 14 is in normal operation the primary piston 42 is limited in its movement by hydraulic pressure in the chamber 48 to a displacement equal to approximately half of its illustrated length.

In the event of a hydraulic pressure loss in either of the chambers 48 or 50 the piston 42 travel will increase for a given amount of force on the pedal 12 until the forces on the secondary piston 44 are in a state of equilibrium, one of the more common causes of a hydraulic pressure loss in either of the chambers 48 or 50 being failure to maintain the fluid reserve in the corresponding reservoir 38 or 40 at an adequate level. A switch assembly 52 is provided in the reservoir 38 for monitoring both the fluid level in the reservoirs 38 and 40 and the primary piston 42 position so as to energize the indicator lamp 36 when either the fluid level in the reservoirs 38 and 40 is below a certain level or when the primary piston 42 is at a position indicating that it has undergone excessive travel to the left. When either of these conditions occurs the switch assembly 52 grounds the indicator lamp 36 so as to complete a current path through the battery 37, the indicator lamp 36, and the housing 41.

A bleed hole 54 is provided in the housing 41 between the reservoirs 38 and 40 to provide a fluid passage therebetween to facilitate maintaining the same fluid level in both of the reservoirs 38 and 40. The switch assembly 52 thus monitors the fluid level in both of the reservoirs 38 and 40 even though it is positioned only in the reservoir 38.

Referring now to FIG. 3, an enlarged view is provided of the switch assembly 52. The switch assembly 52 includes a float assembly 56 comprising a substantially vertical standard 58 and an annular float 60 slidably secured to the standard 58 so as to be responsive to the fluid level in the reservoir 38. The switch assembly 52 also includes an adjustable stop mechanism 62 for establishing an upper limit on the float 60 travel. The stop mechanism 62 includes a stop member 64 having its lower its lower end formed as a cam follower 66 in slidable contact with a cam surface 67 formed in the primary piston 42. The upper end 68 of the stop member 64 is positioned to serve as an abutment so as to limit the float 60 upward travel. The stop mechanism 62 also includes a spring 70 for biasing the stop member 64 downward to maintain contact between the cam follower 66 and the primary piston 42, the upper end of the spring 70 being restrained by a support member 72 positioned in the upper end of the standard 58.

In the alternative, a roller (not shown) may be employed by the cam follower 66 to provide rolling contact with the cam surface 67. However, such a complex configuration is unnecessary inasmuch as the rounded pinlike cam follower is satisfactory.

In addition, the switch assembly 52 includes a detection assembly 74 for detecting when the float 60 is at a position below a certain level, which position corresponds to a predetermined fluid level in the reservoir 38. The detection assembly 74 is comprised of a proximity detector 76 secured to the standard 58 and an actuation device 78 for actuating the proximity detector 76, causing it to change between operative and inoperative conditions. In the illustrated embodiment the proximity detector 76 is a magnetic field responsive switch of the "reed" type having a pair of contacts 80 and 82 closable by a magnetic field. The switch 76 is secured to the standard 58 by a lead 84 connected to the support member 72. The illustrated actuation device 78 is a magnetic field producing device in the form of an annular magnet secured to an interior surface 86 of the float 60 by suitable means of attachment, such as an adhesive. The point at which the magnet 78 is secured to the float 60 is selected so that the magnet field produced by the magnet 78 closes the contacts 80 and 82 of the switch 76 when the float 60 is below a certain level, which level corresponds to the predetermined fluid level at which it is deemed desirable to advise the vehicle operator to replenish the supply of fluid in the vehicle reservoirs 38 and 40. While the illustrated embodiment employs a magnetic field responsive switch 76 and a magnet 78 to monitor the float 60 position it is apparent that other sensing devices, such as limit switches, responsive to the float 60 position may be employed in their stead.

During operation of the subject apparatus the cam follower 66 remains in contact with the cam surface 67 of the piston 42 while the piston 42 undergoes lateral displacement in the bore 46. During this time the upper end 68 of the stop member 64 establishes a first upper float travel limit as illustrated. The position of the float 60 relative to the standard 58 during this time is thus determined by the level of the hydraulic fluid in the reservoir 38. In the event the fluid level in the reservoir 38 falls below the predetermined level and the float 60 falls below the certain level the magnetic field of the magnet 78 closes the switch 76. Closure of the switch 76 causes the indicator lamp 36 to be energized through a current path that includes the battery 37, the indicator lamp 36, a terminal 88, a lead 89, the contacts 80 and 82, the lead 84, the support member 72, and the grounded housing 41. The vehicle operator is thus advised by the energization of the indicator lamp 36 of the low fluid level condition.

Should the piston 42 undergo excessive travel to the left the cam follower 66 will be pressed downward into a recess 90 in cam surface 67 of the piston 42 due to the biasing action of the spring 70. When this occurs the upper end 68 of the stop member 64 is also pressed downward due to the biasing action of the spring 70 so as to establish a second upper float travel limit lower than the first. The depth of the recess 90, and hence the distance between the first and the second upper float travel limits, is selected so as to prevent the float 60 from rising above the certain level when the cam follower 66 is in the recess 90 regardless of the fluid level in the reservoir 38. The magnet 78 is therefore held at a position which maintains the contacts 80 and 82 of the switch 76 closed so long as the cam follower 66 is in the recess 90. The indicator lamp 36 is thus energized until the brake pedal 12 is released.

Upon release of the brake pedal 12 the springs 49 and 51 return the pistons 42 and 44 to their normal positions, causing the cam follower 66 to rise up an inclined surface 92 of the recess 90 so as to leave the recess 90. When the cam follower 66 is no longer in the recess 90 it causes the upper end 68 of the stop member 64 to again establish the first upper float travel limit, permitting travel of the float 60 above the certain level if the fluid in the reservoir is above the predetermined level. The indicator lamp 36 thus indicates that the piston 42 is in such a position as to have undergone excessive travel only so long as the piston is in the overtravel condition. Should the indicator lamp 36 remain energized after the piston 42 has been returned to its normal position it is indicative of low fluid level in the reservoir 38.

As persons skilled in the art will appreciate, a master cylinder assembly is thus provided having contained therein a switch assembly which is operable to monitor both the fluid level in the master cylinder assembly reservoirs and the position of the master cylinder assembly primary piston. While the illustrated embodiment and descriptive materials primarily describe a single mode of practicing this invention, various other modes of practicing the invention without departing from its spirit will be apparent to those skilled in the art.

I claim:

1. In a master cylinder assembly having a housing, a piston including a cam surface having a recess slidably positioned in the housing, and a fluid reservoir, switch apparatus comprising, in combination, float means including a float positioned in the reservoir so as to be responsive to the fluid level in the reservoir and adapted for substantially vertical movement, adjustable stop means including cam follower means for following the cam surface so as to establish an upper float travel limit in accordance with the position of the cam follower means relative to the recess, a first upper float travel limit being established so as to permit float travel above a certain level when the cam follower means is not in the recess and a second upper float travel limit being established below the first upper float travel limit so as to preclude float travel above the certain limit when the cam follower means is in the recess, and means for detecting the float position relative to the certain level whereby the float position may be used to monitor both the fluid level in the reservoir and the piston position.

2. In a master cylinder assembly having a housing, a piston including a cam surface having a recess slidably positioned in the housing, and a fluid reservoir, switch apparatus comprising in combination, float means including a float positioned in the reservoir so as to be responsive to the fluid level in the reservoir and adapted for substantially vertical movement, adjustable stop means including cam follower means for following the cam surface so as to establish an upper float travel limit in accordance with the position of the cam follower means relative to the recess, a first upper float travel limit being established so as to permit float travel above a certain level when the cam follower means is not in the recess and a second upper float travel limit being established below the first upper float travel limit so as to preclude float travel above the certain limit when the cam follower means is in the recess, and means for detecting the float position relative to the certain level including a float position responsive switch rendered inoperative when the float is above the certain level and inoperative when the float is below the certain level whereby the float position may be used to monitor both the fluid level in the reservoir and the piston position.

3. In a master cylinder assembly having a housing, a piston including a cam surface having a recess slidably positioned in the housing, and a fluid reservoir, switch apparatus comprising, in combination, float means including a float positioned in the reservoir so as to be responsive to the fluid level in the reservoir and adapted for substantially vertical movement, adjustable stop means including cam follower means for following the cam surface so as to establish an upper float travel limit in accordance with the position of the cam follower means relative to the recess, a first upper float travel limit being established so as to permit float travel above a certain level when the cam follower means is not in the recess and a second upper float travel limit being established below the first upper float travel limit so as to preclude float travel above the certain limit when the cam follower means is in the recess, and means for detecting the float position relative to the certain level including a proximity detector secured to the housing and actuation means for actuating the proximity detector secured to the float whereby the float position may be used to monitor both the fluid level in the reservoir and the piston position.

4. In a master cylinder assembly having a housing, a piston including a cam surface having a recess slidably positioned in the housing, and a fluid reservoir, switch apparatus comprising, in combination, float means including a float positioned in the reservoir so as to be responsive to the fluid level in the reservoir and adapted for substantially vertical movement, adjustable stop means including both cam follower means for following the cam surface and biasing means for maintaining contact between the cam follower and the cam surface so as to establish an upper float travel limit in accordance with the engagement by the cam follower means of the recess, a first upper float travel limit being established so as to permit float travel above a certain level when the cam follower means does not engage the recess and a second upper float travel limit being established below the first upper float travel limit so as to preclude float travel above the certain limit when the cam follower means engages the recess, and means for detecting the float position relative to the certain level whereby the float position may be used to monitor both the fluid level in the reservoir and the piston position.

5. In a master cylinder assembly having a housing, a piston including a cam surface having a recess slidably positioned in the housing, and a fluid reservoir, switch apparatus comprising, in combination, float means including a float positioned in the reservoir so as to be responsive to the fluid level in the reservoir and adapted for substantially vertical movement, adjustable stop means including both cam follower means for following the cam surface and biasing means for maintaining contact between the cam follower means and the cam surface so as to establish an upper float travel limit in accordance with the position of the cam follower means relative to the recess, a first upper float travel limit being established so as to permit float travel above a certain level when the cam follower means is not in the recess and a second upper float travel limit being established below the first upper float travel limit so as to preclude float travel above the certain limit when the cam follower means is in the recess, and means for detecting the float position relative to the certain level including a proximity detector secured to the housing and actuation means for actuating the proximity detector secured to the float whereby the float position may be used to monitor both the fluid level in the reservoir and the piston position.

6. In a master cylinder assembly having a housing, a piston including a cam surface having a recess slidably positioned in the housing, and a fluid reservoir, switch apparatus comprising, in combination, float means including a float positioned in the reservoir so as to be responsive to the fluid level in the reservoir and adapted for substantially vertical movement, adjustable stop means including cam follower means for following the cam surface so as to establish an upper float travel limit in accordance with the position of the cam follower means relative to the recess, a first upper float travel limit being established so as to permit float travel above a certain level when the cam follower means is not in engagement with the recess and a second upper float travel limit being established below the first float travel limit so as to preclude float travel above the certain limit when the cam follower means is in engagement with the recess, and means for detecting the float position relative to the certain level including a proximity detector incorporating a switch responsive to a magnetic field secured to the housing and actuation means incorporating magnetic field generating means for actuating the switch secured to the float whereby the float position may be used to monitor both the fluid level in the reservoir and the piston position.

7. In a master cylinder assembly having a housing, a piston including a cam surface having a recess slidably positioned in the housing, and a fluid reservoir, switch apparatus comprising, in combination, float means including a float positioned in the reservoir so as to be responsive to the fluid level in the reservoir and adapted for substantially vertical movement, adjustable stop means including cam follower means for following the cam surface so as to establish an upper float travel limit in accordance with the position of the cam follower means relative to the recess, a first upper float travel limit being established so as to permit float travel above a certain level when the cam follower means is not in the recessed portion and a second upper float travel limit being established below the first upper float travel limit so as to preclude float travel above the certain limit when the cam follower means is in the recess, and means for detecting the float position relative to the certain level including a proximity detector incorporating a switch responsive to a magnetic field secured to the housing and actuation means incorporating a magnet for generating a magnetic field operable to actuate the switch secured to the float whereby the float position may be used to monitor both the fluid level in the reservoir and the piston position.

8. In a master cylinder assembly having a housing, a piston including a cam surface having a recess slidably positioned in the housing, and a fluid reservoir, switch apparatus comprising, in combination, float means including a standard secured to the housing and a float slidably secured to the standard so as to be responsive to the fluid level in the reservoir and adapted for substantially vertical movement, adjustable stop means including both cam follower means for following the cam surface of the piston and biasing means for maintaining contact between the cam follower means and the cam surface so as to establish an upper float travel limit in accordance with the position of the cam follower relative to the recess, a first upper float travel limit being established so as to permit float travel above a certain level when the cam follower means is not in the recess and a second upper float travel limit being established below the first upper float travel limit so as to preclude float travel above the certain level when the cam follower means is in the recess, and means for detecting the float position relative to the certain level including a proximity detector incorporating a magnetic field responsive switch secured to the housing and actuation means incorporating a magnet for generating a magnetic field so as to actuate the switch secured to the float whereby the float position may be used to monitor both the fluid level in the reservoir and the piston position.